United States Patent
Kennedy, Jr.

(10) Patent No.: US 11,003,788 B2
(45) Date of Patent: *May 11, 2021

(54) REACH OBJECTS WITH COMPARISON TECHNIQUES

(71) Applicant: Vinyl Development LLC, Miami Beach, FL (US)

(72) Inventor: Thomas R. Kennedy, Jr., Miami Beach, FL (US)

(73) Assignee: Vinyl Development LLC, South Harwich, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/925,214

(22) Filed: Mar. 19, 2018

(65) Prior Publication Data

US 2019/0065774 A1 Feb. 28, 2019

Related U.S. Application Data

(63) Continuation of application No. 15/654,225, filed on Jul. 19, 2017, now Pat. No. 9,922,204.

(51) Int. Cl.
*G06F 21/62* (2013.01)
*G06F 21/60* (2013.01)

(52) U.S. Cl.
CPC ........ *G06F 21/6227* (2013.01); *G06F 21/604* (2013.01); *G06F 2221/2141* (2013.01)

(58) Field of Classification Search
None
See application file for complete search history.

(56) References Cited

U.S. PATENT DOCUMENTS

| | | |
|---|---|---|
| 5,450,581 A | 9/1995 | Bergen |
| 9,922,204 B1 | 3/2018 | Kennedy, Jr. |
| 2003/0110467 A1* | 6/2003 | Balakrishnan .......... G06F 16/25 717/104 |
| 2009/0106815 A1 | 4/2009 | Brodie |
| 2009/0199273 A1* | 8/2009 | Yalamanchi ........ G06F 21/6227 726/4 |
| 2016/0125189 A1* | 5/2016 | Antonopoulos ...... G06F 21/604 726/30 |
| 2017/0228560 A1 | 8/2017 | Johnson |

* cited by examiner

*Primary Examiner* — Fatoumata Traore
(74) *Attorney, Agent, or Firm* — Fish & Richardson P.C.

(57) ABSTRACT

Methods, systems, and apparatus, including computer programs encoded on computer storage media, for a row-level security. One of the methods includes receiving a request for one or more objects. The method includes determining that a type of the one or more requested objects is associated with an object representative of instance level security. The method includes determining access is authorized to at least some of the one or more objects. Determining access includes obtaining a first access statement associated with the type of the one or more objects, obtaining a second access statement associated with the object representative of instance level security, combining at least the first access statement and the second access statement into a third access statement, and obtaining one or more objects using the third access statement. The method also includes providing the authorized subset of objects to the user.

21 Claims, 12 Drawing Sheets

REACH OBJECTS WITH COMPARISON TECHNIQUES

CROSS-REFERENCE TO RELATED APPLICATIONS

This application is a continuation application of and claims priority to U.S. application Ser. No. 15/654,225, filed on Jul. 19, 2017. The entire disclosure of this application is incorporated by reference herein.

BACKGROUND

Row-Level Security (RLS) enables customers to control access to rows in a database table based on the characteristics of the user executing a query (e.g., group membership or execution context). Row-Level Security simplifies the design and coding of security in your application. RLS enables you to implement restrictions on data row access (for example, ensuring that workers can access only those data rows that are pertinent to their department, or restricting a customer's data access to only the data relevant to their company).

Many systems do, however, share a common database connection such that a database is unaware of the particular user accessing the database. Instead, an application is used to regulate access to the data.

SUMMARY

In general, one innovative aspect of the subject matter described in this specification can be embodied in methods that include the act of receiving, by a computer device, a request from a user for one or more objects. The methods include the act of determining that a type of one of the one or more requested objects is associated with an object representative of instance level security. The methods include the act of in response to determining that the type is associated with the object representative of instance level security, determining access is authorized to at least some of the one or more objects. Determining data access includes obtaining a first access statement associated with the type of the one or more objects, obtaining a second access statement associated with the object representative of instance level security, combining at least the first access statement and the second access statement into a third access statement, obtaining an authorized subset of the one or more objects using the third access statement, and providing the at least some of the authorized subset of objects to the user.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by the data processing apparatus, cause the apparatus to perform the actions.

The foregoing and other embodiments can each optionally include one or more of the following features, alone or in combination. The methods may include the act of determining that a type of one of the one or more requested objects is associated with a second object representative of instance level security. The methods may include the act of obtaining a fourth access statement associated with the second object representative of instance level security. Combining at least the first access statement and the second access statement into a third access statement may include combining the first access statement, the second access statement, and the fourth access statement. Obtaining an authorized subset of the one or more objects may include obtaining one or more objects that are identified by both the second access statement and the fourth access statement. Obtaining an authorized subset of the one or more objects may include obtaining one or more objects that are identified by either the second access statement or the fourth access statement. Multiple objects representative of instance level security may be associated with the same type of object. The object representative of instance level security may be associated with a name and wherein determining the user is authorized to access at least some of the one or more objects is based at least in part on the name. Securing the object using the object representative of instance level security may not require change to a user interface accessing the one or more objects.

Particular embodiments of the subject matter described in this specification can be implemented so as to realize one or more of the following advantages. Objects can be secured at the instance level. Row level security can be implemented at the data and object level without requiring adjustment to the presentation tier.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

User interfaces can be implemented using data from multiple data sources. Organizations tend to store information in many disparate data sources. These data sources can include relational databases, enterprise products, data warehouses, and cloud based data systems. This use of disparate data sources can arise for many reasons, including the continued use of older systems, the selection of disparate "best in class" systems for different functionality, the development of systems that use newer technology while older systems remain, the purchase of third party products that do not offer the complete suite of functionality desired by an organization, etc.

Figure 1:
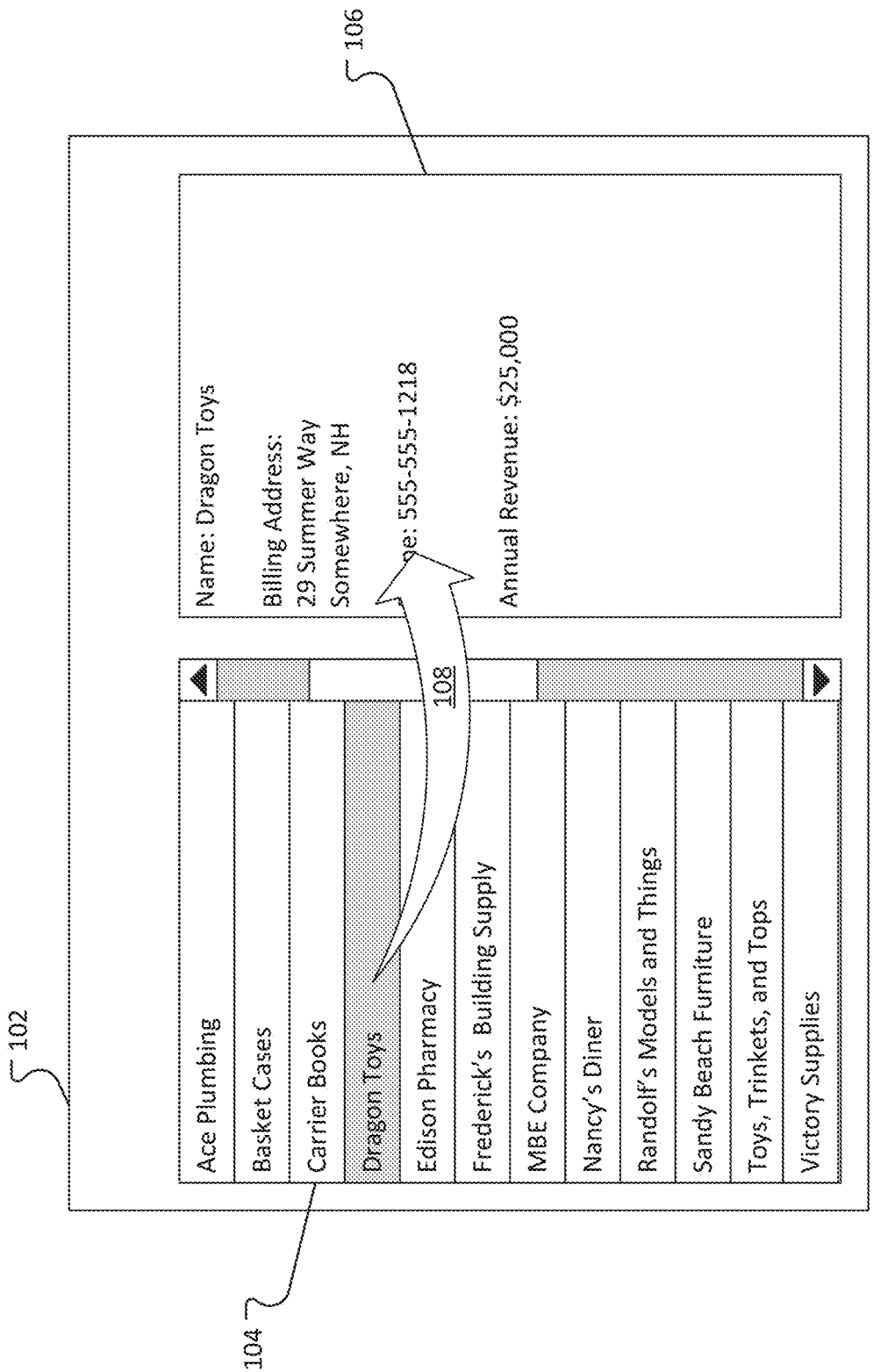
FIG. 1 illustrates an example of a user interface.

FIG. 1 illustrates an example user interface 102 that includes a first panel 104 and a second panel 106. The first panel 104 includes a list of items and the second panel 106 displays information about a selected item in the list on the first panel 104 (the selection being graphically represented by an arrow 108). The example in FIG. 1 illustrates the first panel 104 as containing a list box. A list box can be considered a graphical control element that allows a user to select one or more items from a list contained within a static, multiple line text box. Other graphical controls that allow a user to select an item from a predetermined list can be used and are consistent with the example. For example, the user may select from a drop-down list, which is a graphical control element similar to a list box that allows the user to choose one value from a list. When a drop-down list is inactive, it displays a single value. When it is activated, it displays (drops down) a list of values from which the user may select one value. When the user selects a new value, the control reverts to its inactive state, displaying the selected new value.

Complexity is introduced when the data used to generate the list in the first panel 104 is stored, at least in part, in a data store that is separate from the data store that contains the information presented in the second panel 106.

Figure 2:
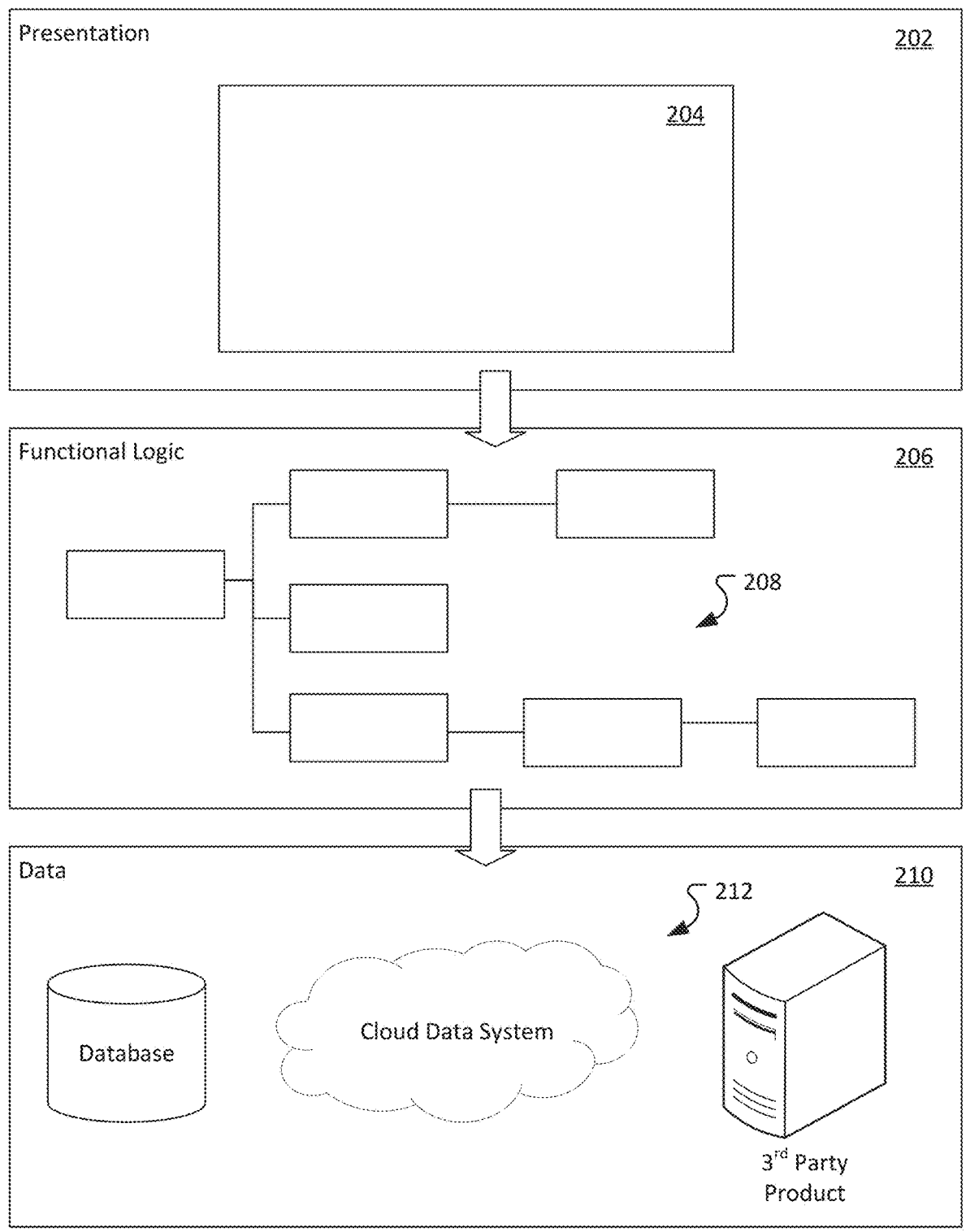
FIG. 2 illustrates an example of a three-tier architecture.

FIG. 2 illustrates an example of a three-tier architecture. In general, a multi-tier architecture can be a client-server architecture in which presentation, application processing, and data management functions are physically separated. One often-implemented multi-tier architecture is the three-tier architecture. Three-tier architecture is a client-server architecture in which a presentation tier 202 (for example, user interface 204), functional logic tier 206 (for example, an object model 208), and data architecture tier 210 (for example, data storage systems 212) are developed and maintained as independent modules, frequently on separate platforms.

In some arrangements, the presentation tier 202 can be the top-level of an application. The main function of the presentation tier can be to translate business processes into a form the user can understand. The functional logic tier 206 can coordinate the application, process commands, perform calculations, etc. and make logical decisions, evaluations, etc. The data tier 210 often coordinates the storage and retrieval of data from one or more data storage systems.

In general, each tier of the architecture interacts with one of the other tiers (e.g., one adjacent tier). In this example, a tier may interact with the tier that is graphically represented as being directly below it. As such items in a tier can interact with items in the tier directly below. For example, the user interface 204 may access the object model 208. Further, the object model 208 can access a function provided by the data storage systems 212. The user interface 204, however, would generally not interact with the data storage systems 212 directly, as the data storage systems 212 is not directly below the user interface 204, in this example. The objects in the object model may have object types. An object type is a composite datatype that encapsulates a data structure along with the functions and procedures needed to manipulate the data. The variables that form the data structure can be referred to as attributes. An object type can refer to the kind of data in aggregate, for example, customers generally, as opposed to a particular customer (the particular customer can be referred to as an instance).

Different developers may focus on different tiers. For example, GUI designers and web developers may focus on the presentation tier 202. Application developers and business architects may focus on the functional logic tier 206. Database administrators and database programmers may focus on the data tier 210. In some scenarios, certain types of developers may focus on multiple tiers. For example, security can be an enterprise specialty that influences each of the tiers mentioned above.

Generally, if a user has access to a data source in the data tier, the user can access everything contained within that data source. For example, access to the customer table may allow the user to view the entire customer table. It is not always desirable, however, to allow users to access all the data in a particular data source. A reach object can be used in conjunction with an object in the functional logic tier in order to secure individual data items. For example, a customer object may have a type that is associated with a reach object. All individual customers (or the customer object type) can be associated with the reach object. The association is a signal that data in each customer object is protected on a customer by customer basis. For example, one user may have access to some customers but may not have access to others. In some implementations, the reach object can be associated with an object in the data tier. For example, the data tier may include an object that obtains data for the customer object from a persistent data store (such as a relational database.) The object may include methods to obtain the data for these objects (such as a SQL statement).

In the data tier, securing individual data items is referred to as Row-Level Security. Row-level security refers to relational databases where data is stored in a table. The fields of the data are referred to as columns while entries in the table are referred to as rows. With Row-Level Security, users can have access to a table or other data source without having access to all rows on that table. For example, a user may be authorized to view some rows (e.g., customers) but not authorized to view other rows (e.g., other customers). In some implementations, software components may be created to control and manage access to data stored in data storage systems. For example, one or more data objects may enable access to a table or portions of a table in a relational database.

Figure 3:
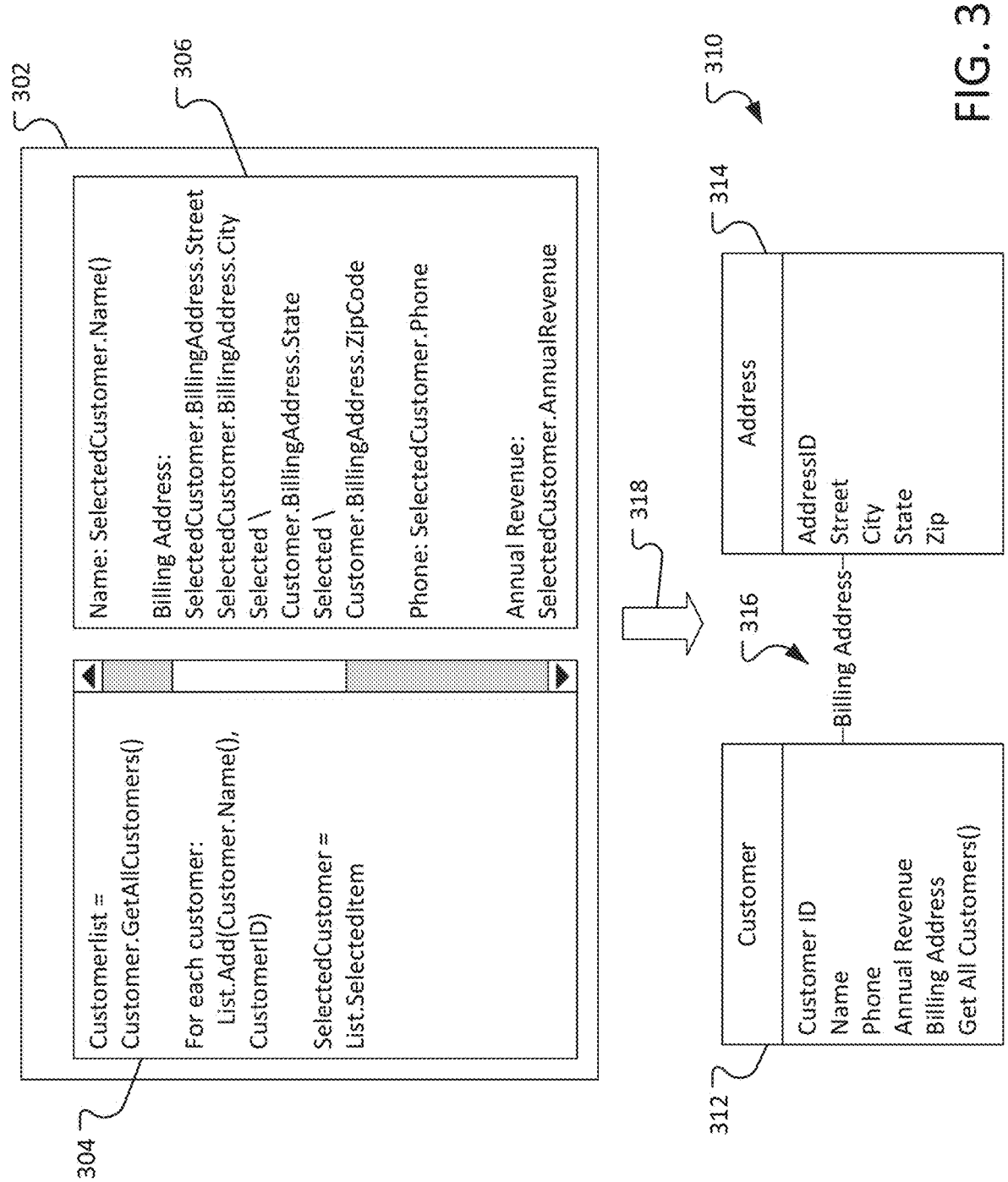
FIG. 3 illustrates an example of a user interface in a presentation tier that is accessing objects in a functional logic tier.

FIG. 3 illustrates an example of a user interface 302 in a presentation tier that is accessing objects in a functional logic tier. The user interface 302 includes a first panel 304 and a second panel 306. The first panel 304 and the second panel 306 present pseudo code, which, when executed, would then populate panel 304 with a customer list (from which a customer can be selected) and populate panel 306 with information (address, phone number, etc.) for the selected customer.

A customer object 312 and an address object 314 reside in the functional logic tier of the application, which is located below the presentation tier as graphically represented by an arrow 318. Links can form among objects that reside in these tiers, such as the customer object 314 and the address object 314. For example, a relationship 316 exists between the customer object 312 and the address object 314, which can be used to identify the billing address of a particular customer.

One technique used in developing applications in the functional logic tier is object-oriented programing. Object-oriented programing a class of type of an object represents the object generally (herein referred to a class of type). A class of type of the object may be a customer or a product. This is distinguished from an object or instance, which references a particular thing. An instance may represent the customer "John Smith" or the product "Pet Rock" (herein referred to as an object or instance).

Based upon the presentation tier being position above the functional logic tier in this example, the user interface 302 can access the objects 312, 314. To access the objects, one or more techniques may be employed; for example, the first panel 304 (of the user interface 302 which may be user interface 102 of FIG. 1) may include pseudo code sufficient to generate a list of customers (for example, the list of customers in the first panel 104 of FIG. 1). In order to populate the first panel 304 of the user interface 302, the user interface may access the customer object 312. In this example, a GetAllCustomers( ) method on the customer object 312 can be used to obtain a list of all customers. The application iterates over the list of returned customers and adds the name of each customer to the list presented in the first panel 304. The pseudo code also allows for a customer to be selected from the list of customers.

The second panel 306 includes pseudo code sufficient to populate the second panel with information about the customer object 312. In this example, the second panel 306 is populated with the name of the customer selected from the customer list in panel 304. The pseudo code 306 includes instructions that use the relationship 316 to navigate from the object 312 of the selected customer. The pseudo code 306 also identifies a billing address provided by the address object 314. The pseudo code 306 also navigates the billing address relationship 316 in order to identify the billing address 314 for the selected customer. The second panel 306 is populated with the street, city, state, and zip code of the billing address. The second panel 306 is also populated with the selected customer's phone number and annual revenue.

Developing a user interface by using these objects allows a developer to produce a user interface without regard for where the underlying data is stored. Instead, coordinating between the objects and the persistent data is relegated to the functional object and data tiers.

Figure 4:
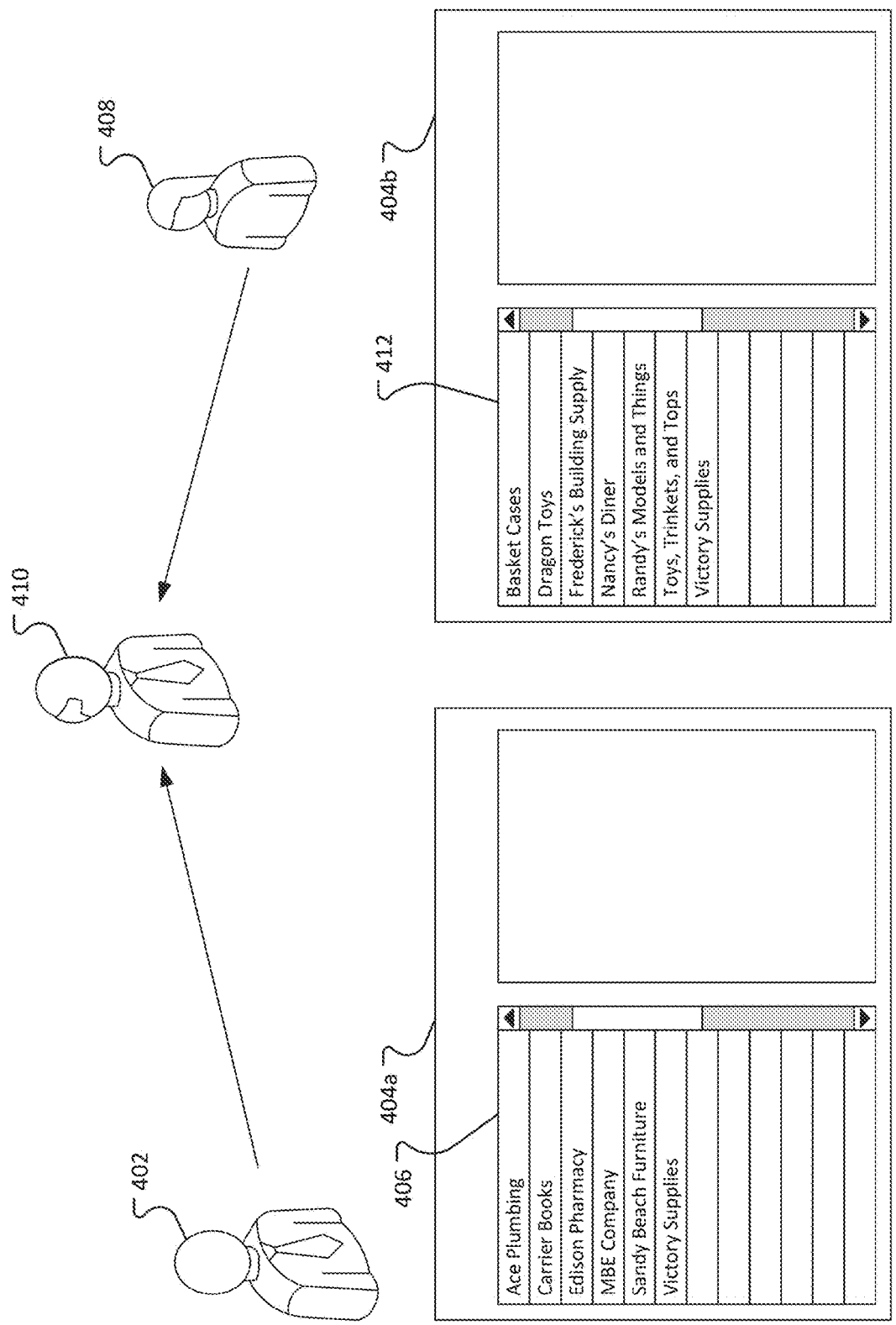
FIG. 4 illustrates an example of limiting user access to data.

FIG. 4 illustrates an example of limiting data access by the user. In this example, customers are protected individually. When user 402 accesses an user interface 404a, he is shown a list of customers 406. In this example, the list of customers 406 consists of Ace Plumbing, Carrier Books, Edison Pharmacy, MBE Company, Sandy Beach Furniture, and Victory Supplies.

When a different user 408 accesses a user interface 404b, she is shown a different list of customers 412. In this example, the customers include Basket Cases, Dragon Toys, Frederick's Building Supplies, Nancy's Diner, Randy's Models, Things, and Toys, Trinkets, and Tops, and Victory Supplies.

User 402 and user 408 may have access to different data even though the user 402 and the user 408 may have the same role within the organization. The ability to see data records does not necessarily limit a single customer to a single user. For example, both the user 402 and the user 408 can view the "Victory Supplies" record. Further, the user 402 and the user 408 may each report to a manager 410. The manager may be authorized to view all of the data of both users.

Figure 5:
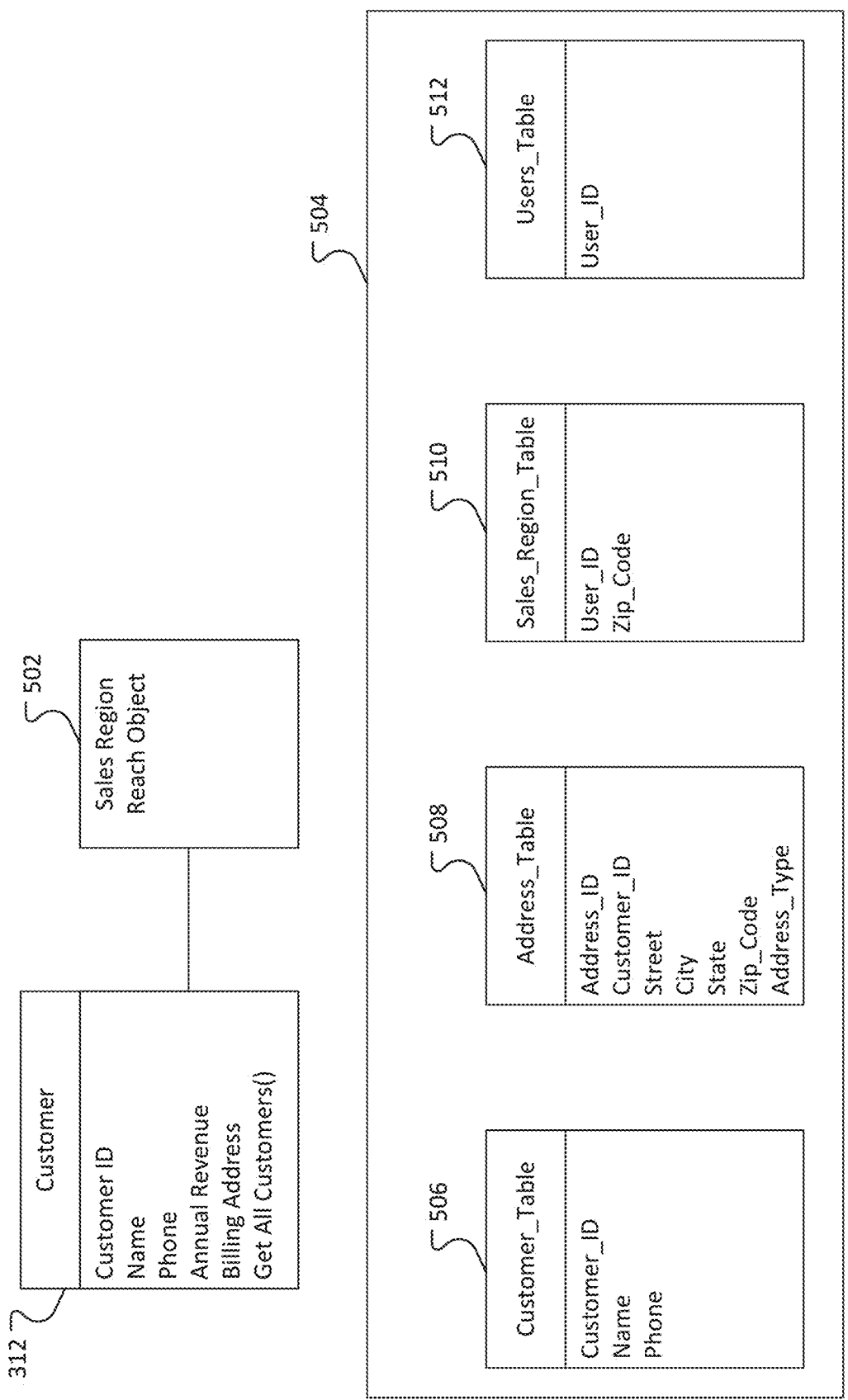
FIG. 5 illustrates an example implementation of a reach object in a data tier.

FIG. 5 illustrates an example implementation of a reach object in a data tier. In this example, the customer object 312 has been associated with a sales region reach object 502. In this example, the sales region reach object 502 is implemented in a relational database 504. The data implementation of a reach object may be performed using any mechanism that is capable of associating a particular user with particular objects. In some implementations, the data store for the reach object may be different from the data store for the object data.

In this example, data for the customer object 312 is stored in a customer table 506 of the database 504. The address of the customer object 312 (for example, the billing address 312) is stored in an address table 508. In this example, the address table 508 is linked to the customer table 506 using the customer id as a foreign key on the address table.

Data for the sales region reach object 502 is stored in a sales region table 510 that links the user_id (from the user table 512) to particular zip codes (from the address table).

Figure 6:
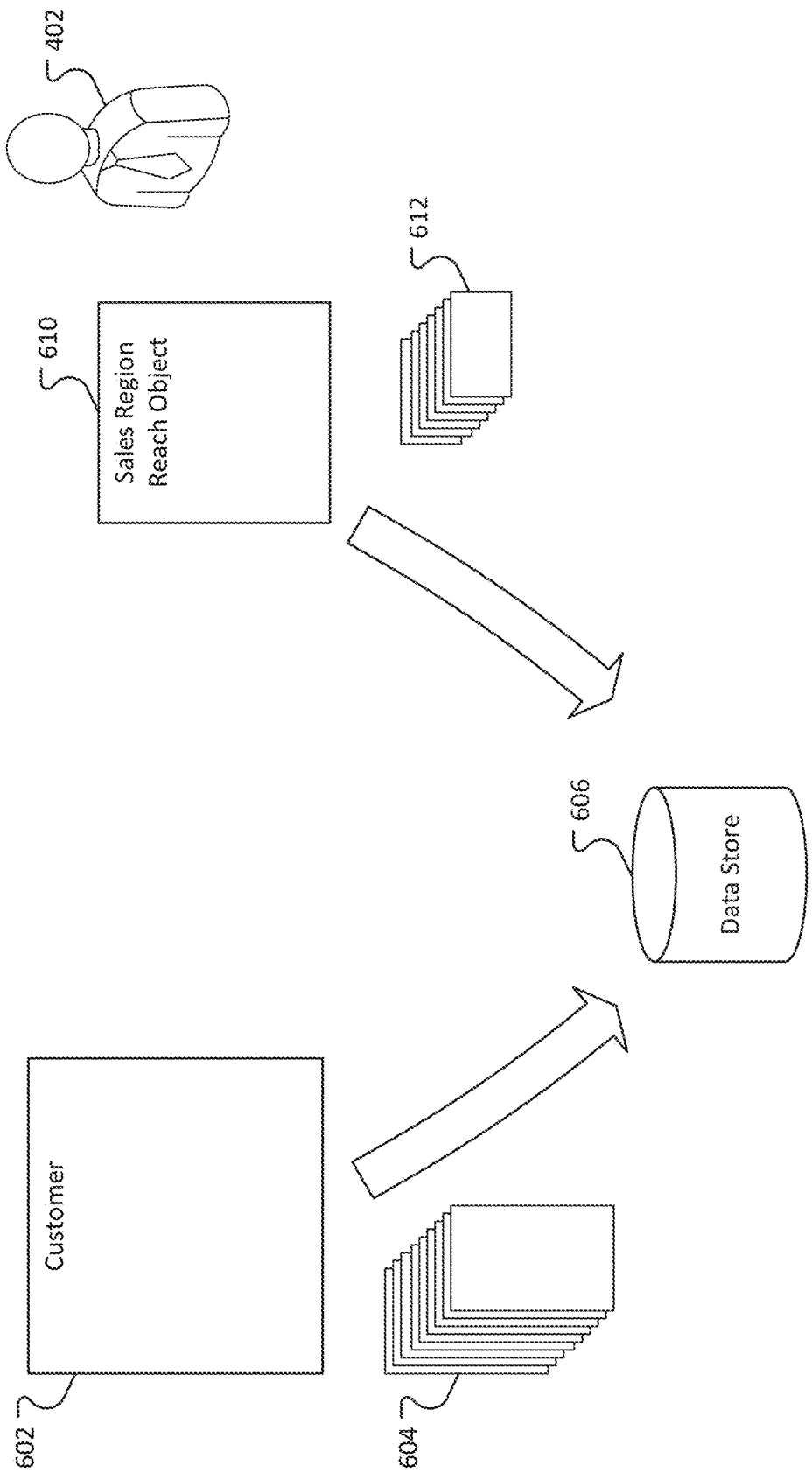
FIG. 6 illustrates a conceptual example of the functionality of the reach object.

FIG. 6 illustrates a conceptual example of the functionality of the reach object. The user 402 wishes to view some data (for example, the customer records available using the user interface 404a of FIG. 4). The data tier (not shown) obtains data for the customer object 604 from a data store 606. The data tier also obtains identifiers 612 for each customer object that satisfies the sales region reach object 610. The system can compare the customer objects 604 to the identifiers 612. Only customer objects that have identifiers that match an identifier in the identifiers 612 will be presented to the user 402.

Figure 7:
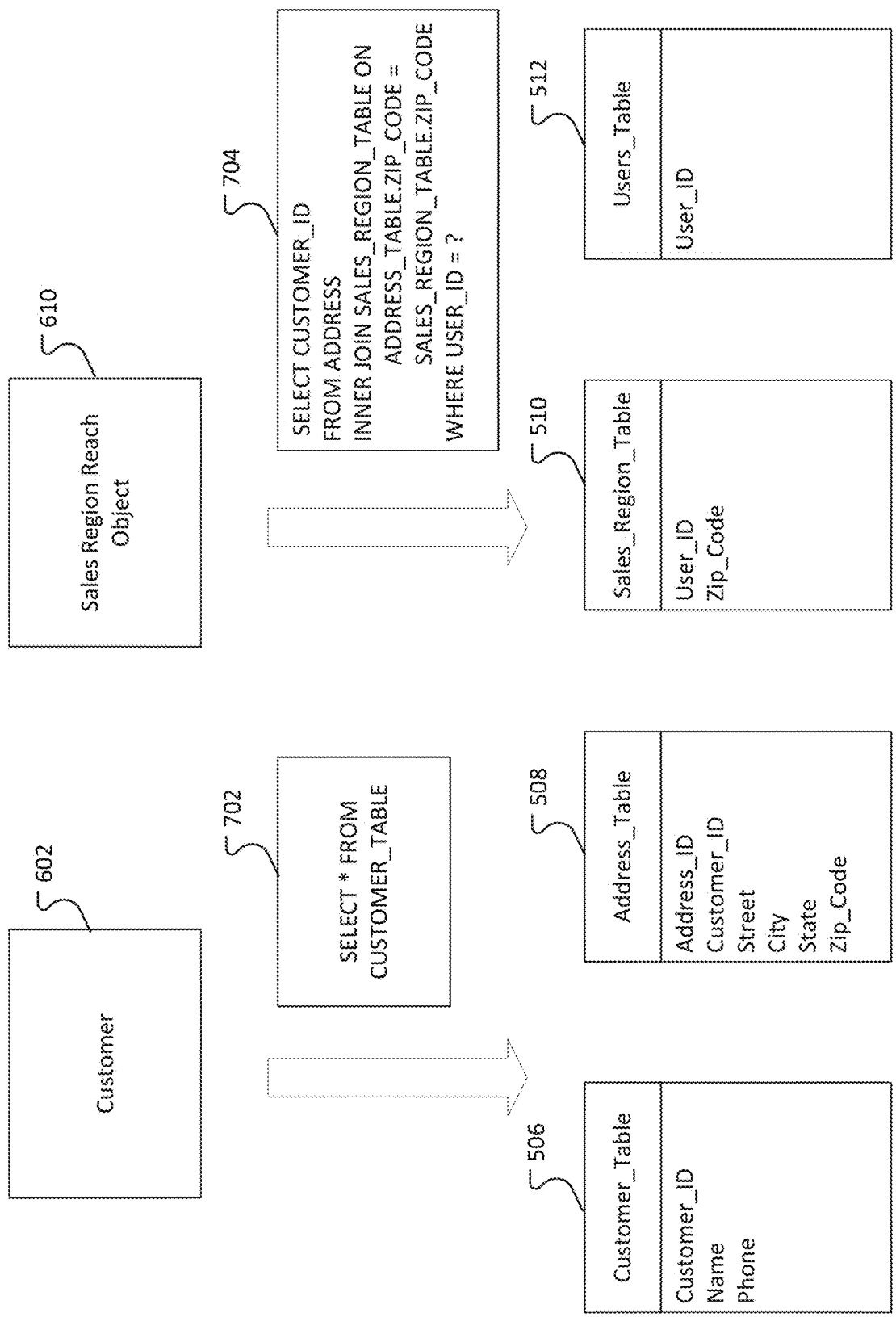
FIG. 7 illustrates an example implementations of the reach object using the SQL language and a relational database.

FIG. 7 illustrates an example implementation of the reach object using the SQL language and a relational database. A data tier may use a data access statement (such as the SQL statement 702) to obtain the customer data. In general, the data tier can access all of the data records without regard to Row-Level Security. The data tier may use a data access statement (such as the SQL statement 704) to obtain a list of identifiers that satisfy the sales region reach object. In this example, all customers in the zip codes are associated with the user in the sales region table.

Figure 8:
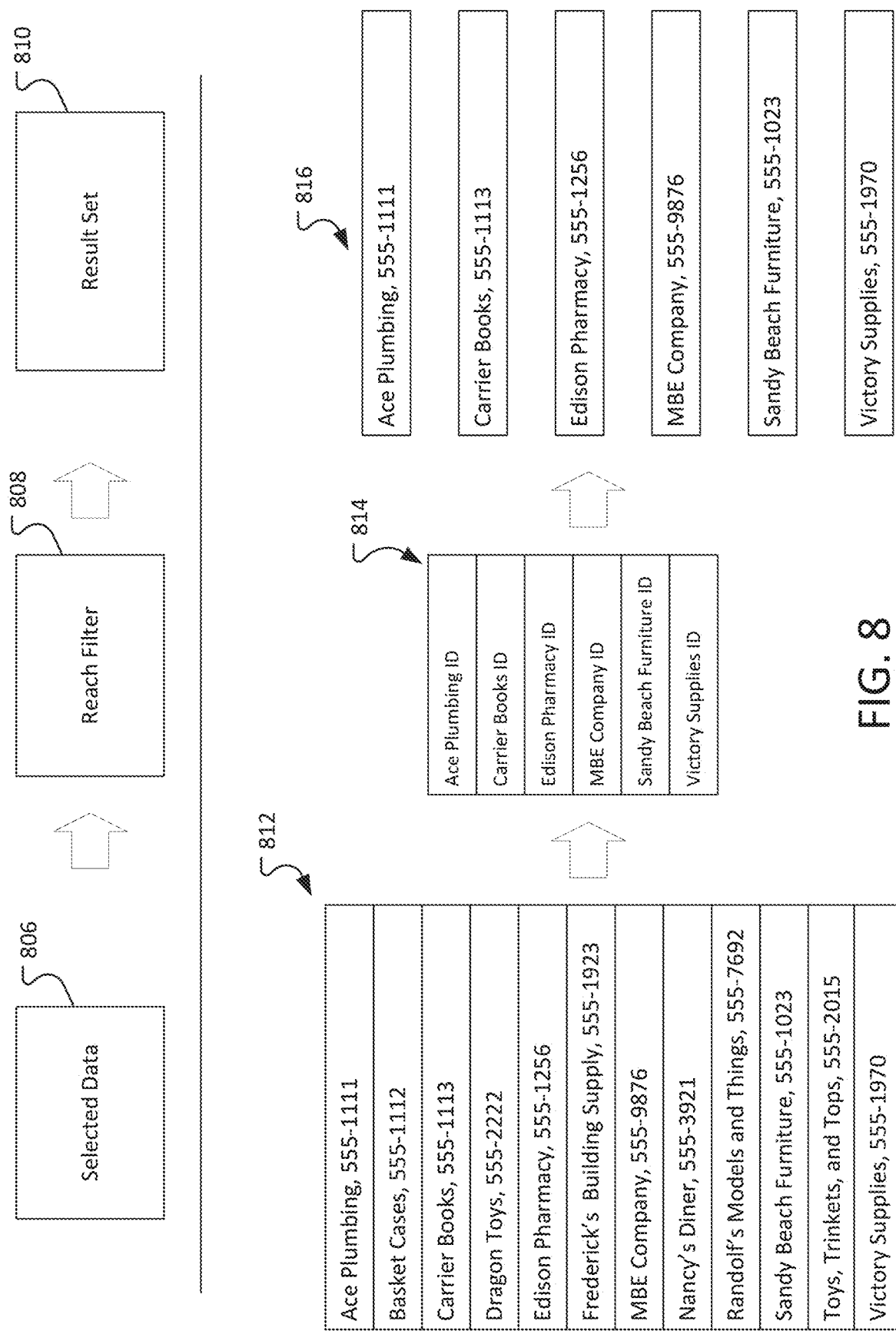
FIG. 8 illustrates an example of applying a reach object.

The customer data can be filtered using the customer identifiers from the reach object. Referring to FIG. 8, the selected data 806 for the business object (for example, the customer object) may be filtered through a reach filter 808 to produce a result set 810. For example, the SQL access statement 702 of FIG. 7 may return the data for customer objects 812. While the customer object 802 is illustrated using only names and telephone numbers (e.g. Ace Plumbing and the corresponding telephone number 555-1111), the customer objects may include all the data for the customer object (for example, the customer object may also include data able the billing address of the customer). The customer objects are compared to the reach filter 808.

The reach filter 808 may include the customer identifiers 814 that were returned by the SQL statement 704. Although the customer identifiers 814 are represented using the name of the customer (e.g., Ace Plumbing), it should be understood that many data records are identified using surrogate keys. A surrogate key is a unique identifier for either an entity or object. A surrogate key is not derived from application data, unlike a natural (or business) key which is derived from application data. The reach object can use either surrogate keys or natural keys depending on the structure of the underlying data.

By returning only the identifiers for the data and not the entire record, the system improves both the computational performance of the SQL query and also uses less memory than would otherwise be required.

Further optimizations can be realized by using a single query (as described further below with respect to FIGS. 11 and 12, or by selecting the identifiers first and then creating a customer SQL statement that obtained only the necessary object. For example, to determine the identifiers (e.g. a list of zip codes) and query the data object using the identifiers in a predicate:

SELECT*
FROM Customers_Table
WHERE Zip_Code IN ('01234', '56789')

Where '01234' and '56789' and zip codes returned from the sales_region_table.

The reach object may compare the selected data to the selected identifier using a variety of different comparison techniques to improve the computational efficiency of the in-memory comparison. For example, the identifiers may be placed in a hash set (or hash table). A hash set is a structure that stores elements in an index-able memory structure, like an array, where the position of the element is equal to some hash value calculated using the object and a hash function. A system can compare the identifier from each element of the selected data to the hash set. If the identifier is in the set, then the element passes the filter. If the identifier is not in the hash set then the element does not pass the filter. A hash set allows for the efficient lookup of individual identifiers. Hash sets allow identifiers to be looked up in an approximately constant time (actual time is represented by the formula $O(\log_{2^H} N)$ where H is the bit size of the hash and N is the number of identifier). This technique has the advantage of having an efficient and essentially constant lookup time for each customer object. Another potential approach is to sort the list of identifiers and to sort the selected data by the identifier. Once the list and the selected data are sorted (using an efficient sorting algorithm such as a quick sort, merge sort, etc.) a single pass through the list and the selected data can reveal which elements of the selected data correspond to identifiers within the list of identifiers.

The customer data elements 816 that pass the reach filter 808 are able to be presented to the user (that is, the user is authorized to view those records).

Figure 9:
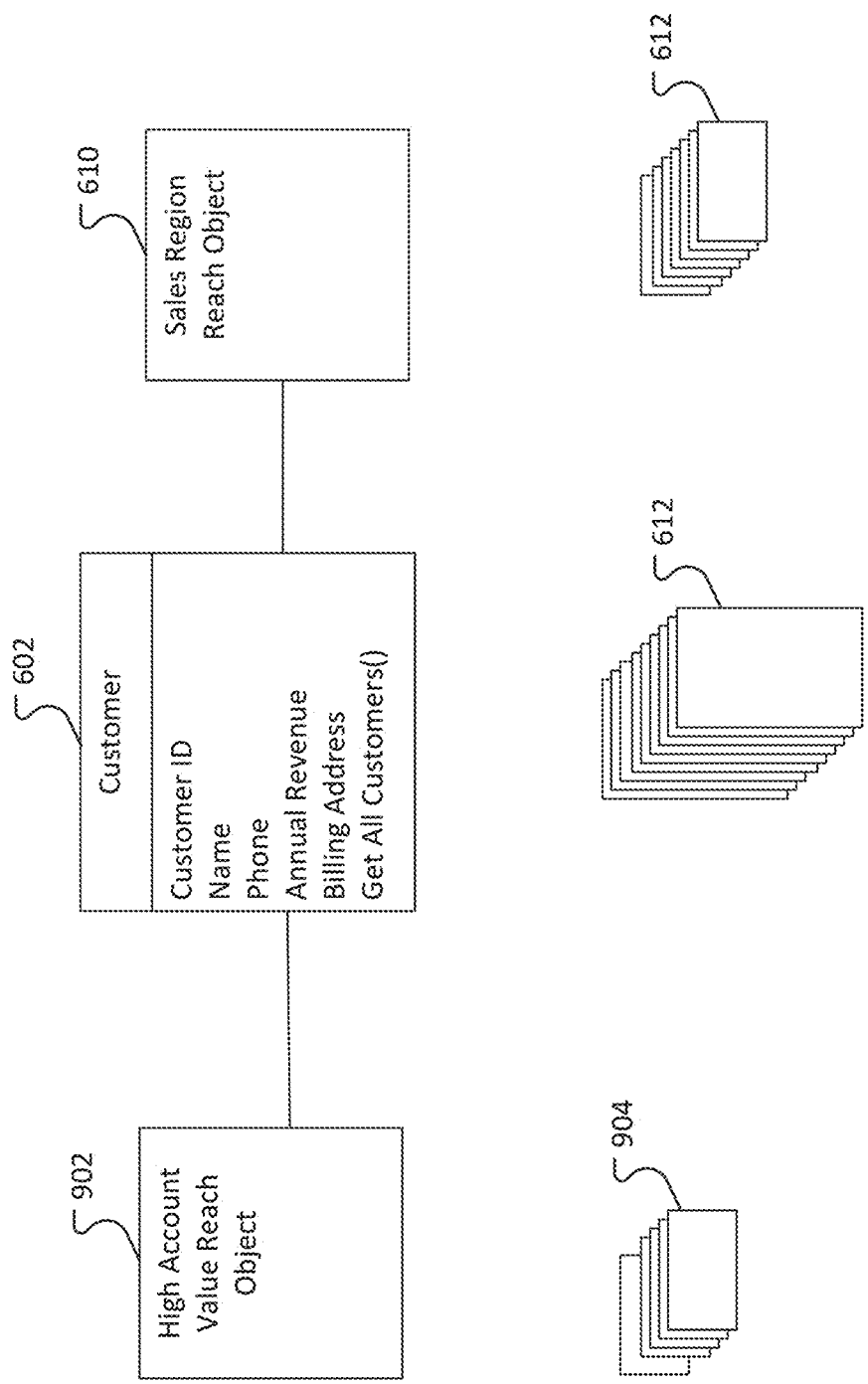
FIG. 9 illustrates multiple reach objects associated with an object.

In some implementations, an object may have multiple different reach objects associated with it. Each reach object may constitute a different row base security feature. For example, referring to FIG. 9, the customer object 602 may be associated with a sales region reach object 610 and a high account value reach object 902. Customer identifiers 612 from the sales region reach object 610 may identify customers that are within the sales area of the user. The high account value reach object 902 may limit access to customers with a very high account value to only more senior sales staff, therefore a second set of customer identifiers 904 may be provided In some implementations, each reach object is applied to the selected data (e.g., customer data 612) before the data is provided to the user. For example, the sales region reach object may narrow the list of customers from 12 to 6, then the high account value reach object may narrow the list of customers from 6 down to 4. In this manner, any number of reach objects may be serially applied to the selected data.

Figure 10:
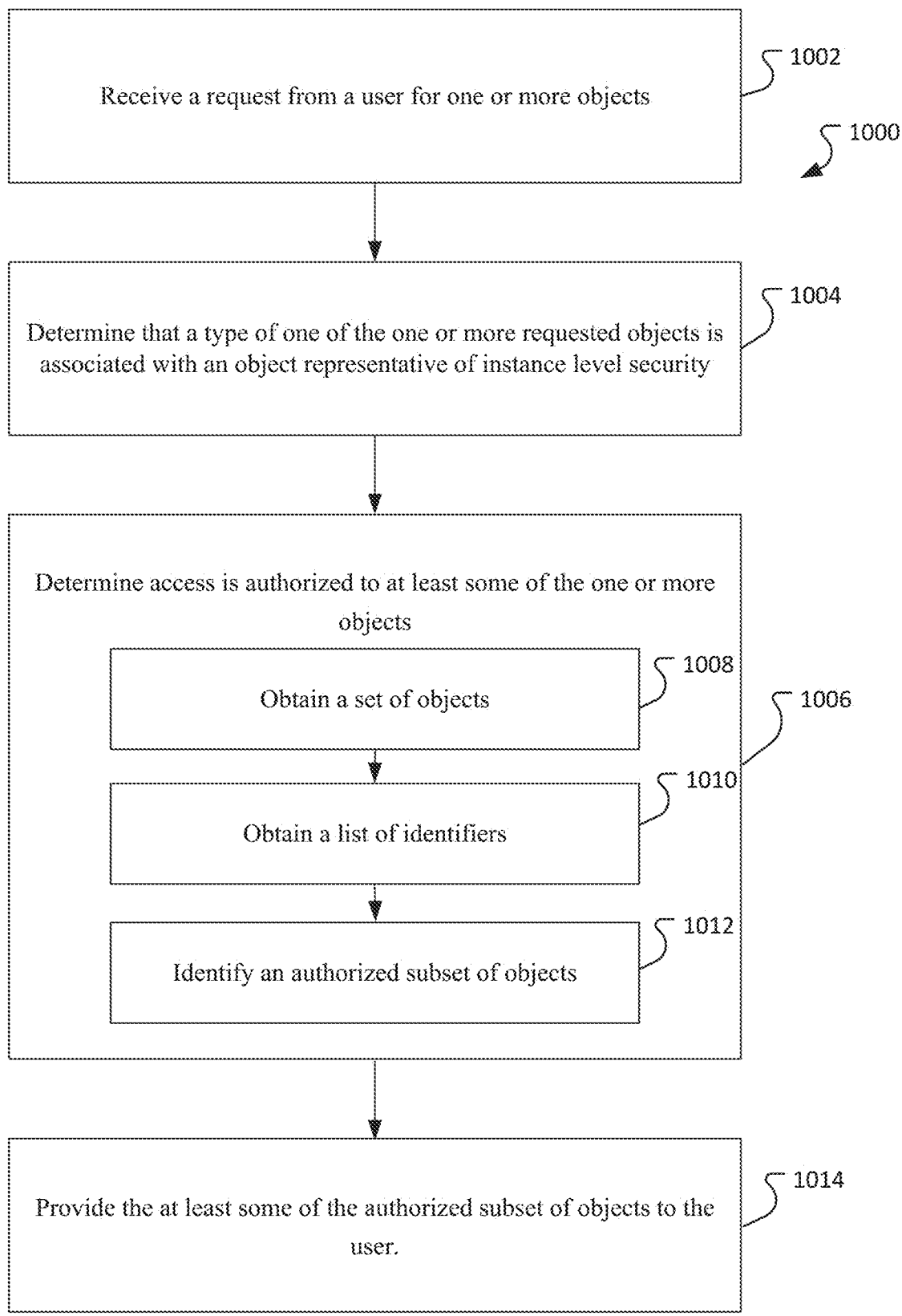
FIG. 10 is a flow chart of an example of a process for instance level security.

FIG. 10 is a flow chart of an example of a process for instance level security.

The process receives 1002 a request from a user for one or more objects.

The process determines 1004 that a type of the one or more requested objects is associated with an object representative of instance level security.

In response to determining that the type is associated with the object representative of instance level security, the process determines 1006 if access is authorized to at least some of the one or more objects.

To determine access, the process 1000 obtains 1008 a set of the objects. The process 1000 obtains 1010 a list of identifiers based on the object representative of instance level security and an identity of the user. The process 1000 identifies 1012 an authorized subset of the set of objects based on the set of objects and the list of identifiers.

The process 1000 provides 1014 at least some of the authorized subset of objects to the user.

Figure 11:
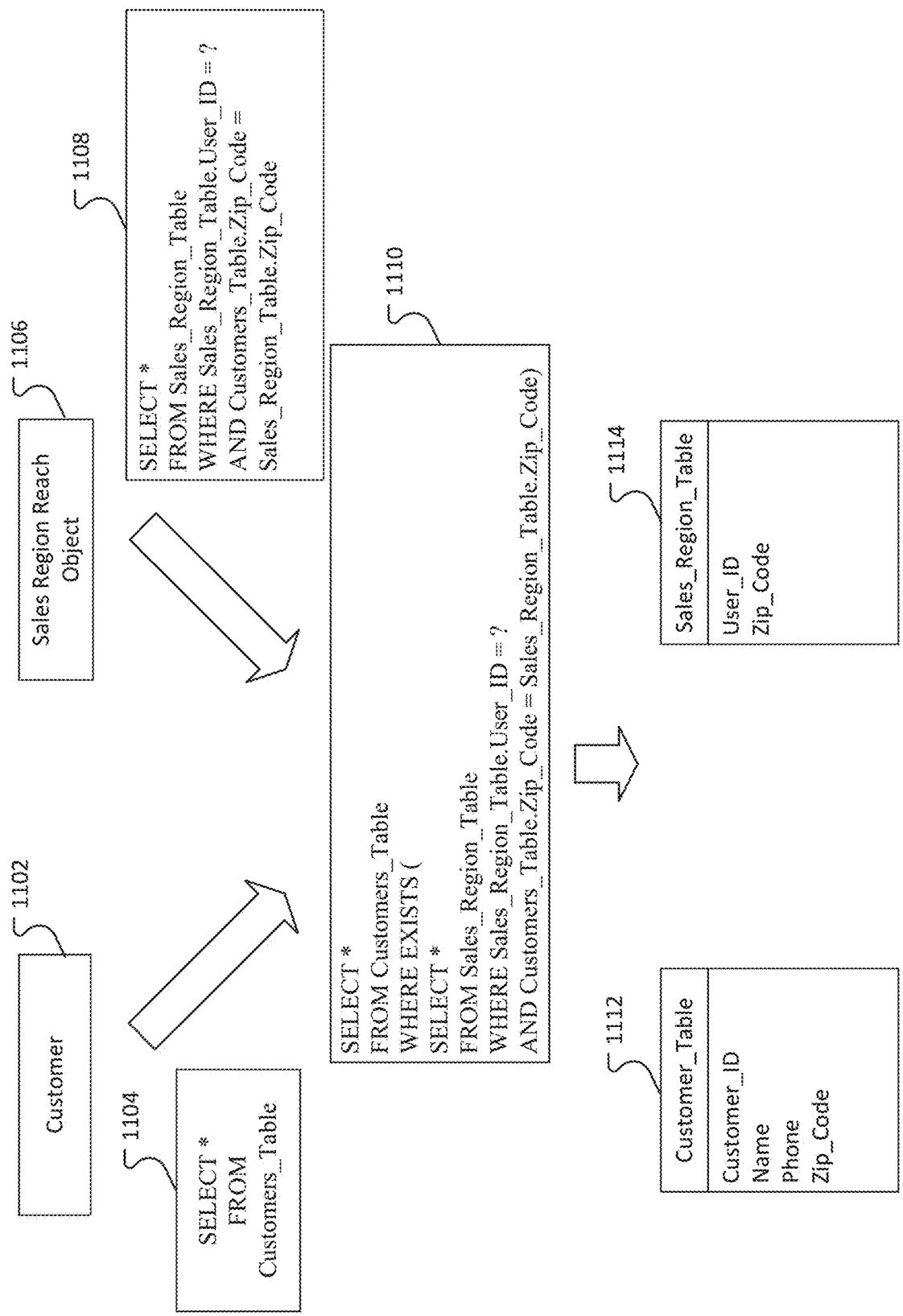
FIG. 11 illustrates another example implementation of the reach object using the SQL.

FIG. 11 illustrates another example implementation of the reach object using the SQL. A data tier may associate a functional logic level entity (such as the customer 1102) with a data access statement (such as the SQL statement 1104) to obtain the customer data. In general, the data tier can access all of the data records without regard to Row-Level Security.

The customer 1102 may be associated with a sales region reach object 1106, as described above. In this example, the sales region object 1106 is associated with a SQL statement 1108. The SQL statement returns the sales region the user has access to (linked through the customer table 1112.)

The SQL statement 1108 associated with the sales region reach object 1106 can be combined with the SQL statement 1104 associated with the customer object 1102 to form a new SQL statement 1110. For example, the SQL statement associated with the customer object 1104 is the primary query, while the SQL statement 1108 associated with the sales region reach object 1106 is included as a sub query. In general, an EXISTS condition is used in combination with a subquery and is considered to be met, if the subquery returns at least one row. In this example, the EXISTS condition is used limit the returned customer rows to customer records from the customer table 1112 where the user is associated with a sales region record in the sales region table 114 that includes the same zip code as the customer record in the customer table 1112.

In some implementations, multiple reach object may be associated with and applied to the same object in the functional logic tier. For example, the customer object may be associated with a sales region reach object 1108 and also associated with another reach object (not shown) that is associated with a different SQL statement. The reach objects can be organized to only return objects when all conditions defined by the reach objects are met (for example, an and statement or an INTERSECT operator can be used) or when any of the conditions are met (for example, a UNION operator can be used). Other combinations of SQL statements, operations, and conditions can be used to achieve the same or similar effect.

While the example above is explained using SQL queries, it is understood, that other mechanisms for querying a data store can be used. For example, queries to a RESTFul service may be used in place of the SQL queries.

Figure 12:
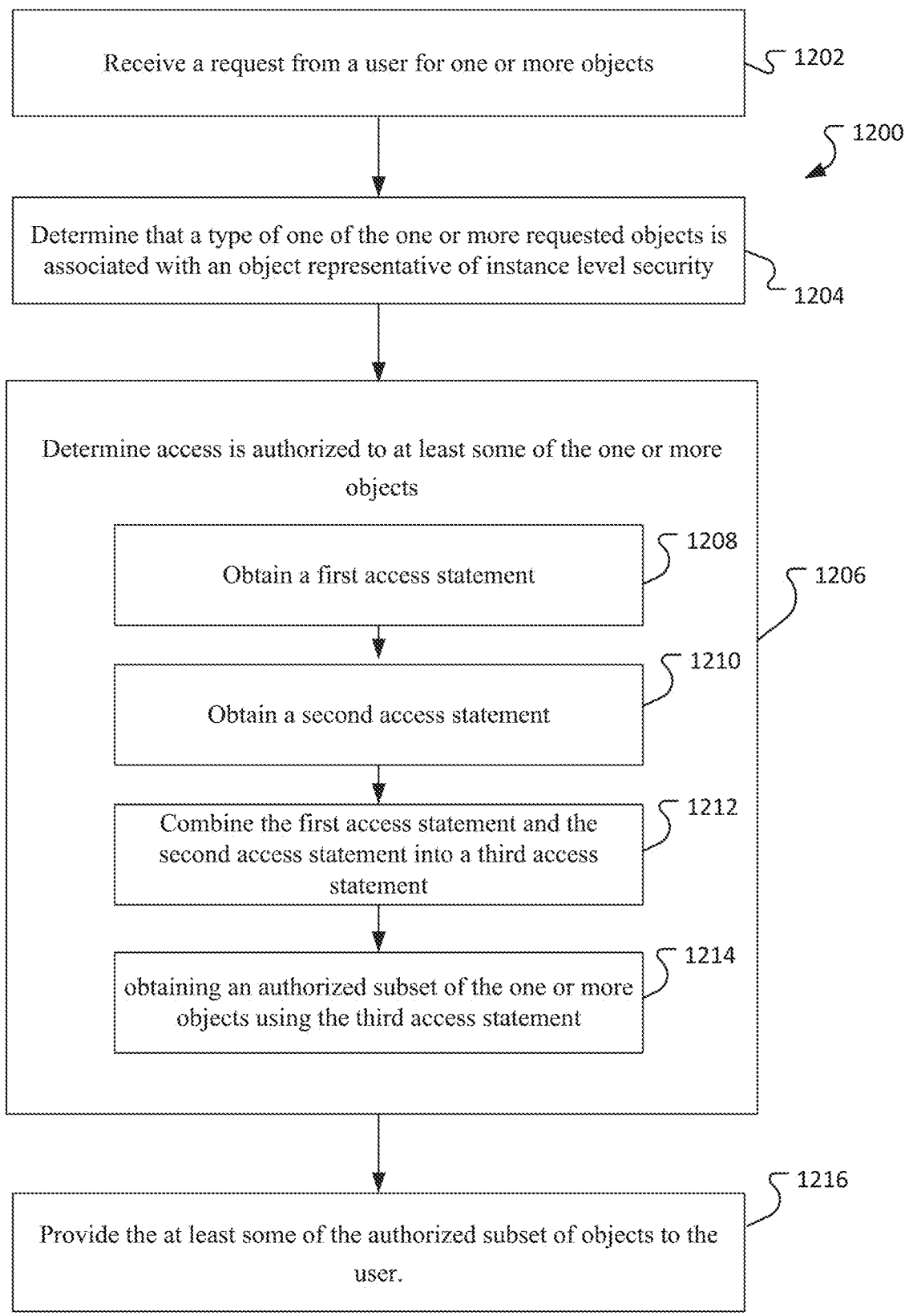
FIG. 12 is a flow chart of an example of a process for instance level security.
Like reference numbers and designations in the various drawings indicate like elements.

FIG. 12 is a flow chart of an example of a process for instance level security.

The process receives 1202 a request from a user for one or more objects.

The process determines 1204 that a type of the one or more requested objects is associated with an object representative of instance level security.

In response to determining that the type is associated with the object representative of instance level security, the process determines 1206 if access is authorized to at least some of the one or more objects.

To determine access, the process 1200 obtains 1208 a first access statement associated with the type of the one or more requested objects. The process 1200 obtains 1210 a second access statement associated with the object representative of instance level security. The process 1200 combines 1212 the first access statement and the second access statement into a third access statement. The process 1200 identifies 1214 an authorized subset of the set of objects based on the set of objects and the list of identifiers.

The process 1200 provides 1216 at least some of the authorized subset of objects to the user.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs (i.e., one or more modules of computer program instructions), encoded on computer storage medium for execution by, or to control the operation of, data processing apparatus.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry (e.g., an FPGA (field programmable gate array) or an ASIC (application specific integrated circuit)). The apparatus can also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures.

A computer program (also known as a program, software, software application, script, or code) can be written in any form of programming language (including compiled or interpreted languages or declarative or procedural languages) and it can be deployed in any form (including as a stand-alone program or as a module, component, subroutine, object, or other unit suitable for use in a computing environment). A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks), however, a computer need not have such devices. Moreover, a computer can be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), to name just a few). Devices suitable for storing computer program instructions and data include all forms of non-transitory computer-readable media and memory devices, including by way of example, semiconductor memory devices (e.g., EPROM, EEPROM, and flash memory devices), magnetic disks (e.g., internal hard disks or removable disks), magneto optical disks, and CD ROM and DVD-ROM disks. The processor and the memory can be supplemented by, or incorporated in, special purpose logic circuitry.

To provide for interaction with a user, embodiments of the subject matter described in this specification can be implemented on a computer that has a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual, auditory, or tactile feedback), and input from the user can be received in any form, including acoustic, speech, or tactile input. In addition, a computer can interact with a user by sending documents to and receiving documents from a device that is used by the user (for example, by sending web pages to a web browser on a user's user device in response to requests received from the web browser).

Embodiments of the subject matter described in this specification can be implemented in a computing system that includes a back end component (e.g., as a data server), a middleware component (e.g., an application server), or a front end component (e.g., a client computer having a graphical user interface or a Web browser through which a user can interact with an implementation of the subject matter described in this specification), or any combination of one or more such back end, middleware, or front end components. The components of the system can be interconnected by any form or medium of digital data communication (e.g., a communication network). Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
    receiving, by a computer device, a request from a user for one or more objects;
    determining that a type of one of the one or more requested objects is associated with one or more objects representative of instance level security, the one or more objects being in an object model;
    in response to determining that the type is associated in the object model with the one or more objects representative of instance level security, determining access is authorized to at least some of the one or more objects, determining access comprising:
        obtaining a first access statement associated with the type of the one or more objects;
        obtaining, from the object model, one or more second access statements each associated with one of the one or more objects representative of instance level security;
        prior to accessing a source of the one or more objects, combining at least the first access statement and the one or more second access statements into a third access statement, the third access statement referencing each of the type of the one or more objects and the one or more objects representative of the instance level security;
    obtaining, based on the third access statement, the one or more objects;
    determining, from an identifier of each of the one or more objects, whether access to that object is authorized;
    based on determining whether access to that object is authorized, obtaining an authorized subset of the one or more objects using the third access statement, the authorized subset being limited to the one or more objects where access to that object is authorized; and
    causing providing the at least some of the authorized subset of objects to the user.

2. The computer-implemented method of claim 1, further comprising:
    determining that a type of one of the one or more requested objects is associated with a second object representative of instance level security; and
    obtaining a fourth access statement associated with the second object representative of instance level security;
    wherein combining at least the first access statement and the second access statement into a third access statement comprises combining the first access statement, the second access statement, and the fourth access statement.

3. The computer-implemented method of claim 2, wherein the obtaining an authorized subset of the one or more objects comprises obtaining one or more objects that are identified by both the second access statement and the fourth access statement.

4. The computer-implemented method of claim 2, wherein the obtaining an authorized subset of the one or more objects comprises obtaining one or more objects that are identified by either the second access statement or the fourth access statement.

5. The computer-implemented method of claim 1 wherein multiple objects representative of instance level security are associated with the same type of object.

6. The method of claim 1, wherein the object representative of instance level security is associated with a name and wherein determining the user is authorized to access at least some of the one or more objects is based at least in part on the name.

7. The method of claim 1, wherein securing the object using the object representative of instance level security does not require change to a user interface accessing the one or more objects.

8. A non-transitory computer storage medium encoded with computer program instructions that when executed by one or more computers cause the one or more computers to perform operations comprising:
    receiving, by a computer device, a request from a user for one or more objects;
    determining that a type of one of the one or more requested objects is associated with one or more objects representative of instance level security, the one or more objects being in an object model;
    in response to determining that the type is associated in the object model with the one or more objects representative of instance level security, determining access is authorized to at least some of the one or more objects, determining access comprising:
        obtaining a first access statement associated with the type of the one or more objects;

obtaining, from the object model, one or more second access statements each associated with one of the one or more objects representative of instance level security;

prior to accessing a source of the one or more objects, combining at least the first access statement and the one or more second access statements into a third access statement, the third access statement referencing each of the type of the one or more objects and the one or more objects representative of the instance level security;

obtaining, based on the third access statement, the one or more objects;

determining, from an identifier of each of the one or more objects, whether access to that object is authorized;

based on determining whether access to that object is authorized, obtaining an authorized subset of the one or more objects using the third access statement, the authorized subset being limited to the one or more objects where access to that object is authorized; and causing providing the at least some of the authorized subset of objects to the user.

9. The non-transitory computer storage medium of claim 8, further comprising:
determining that a type of one of the one or more requested objects is associated with a second object representative of instance level security; and
obtaining a fourth access statement associated with the second object representative of instance level security;
wherein combining at least the first access statement and the second access statement into a third access statement comprises combining the first access statement, the second access statement, and the fourth access statement.

10. The non-transitory computer storage medium of claim 9, wherein the obtaining an authorized subset of the one or more objects comprises obtaining one or more objects that are identified by both the second access statement and the fourth access statement.

11. The non-transitory computer storage medium of claim 9, wherein the obtaining an authorized subset of the one or more objects comprises obtaining one or more objects that are identified by either the second access statement or the fourth access statement.

12. The non-transitory computer storage medium of claim 8, wherein multiple objects representative of instance level security are associated with the same type of object.

13. The non-transitory computer storage medium of claim 8, wherein the object representative of instance level security is associated with a name and wherein determining the user is authorized to access at least some of the one or more objects is based at least in part on the name.

14. The non-transitory computer storage medium of claim 8, wherein securing the object using the object representative of instance level security does not require change to a user interface accessing the one or more objects.

15. A system comprising: one or more computers and one or more storage devices storing instructions that are operable, when executed by the one or more computers, to cause the one or more computers to perform operations comprising:
receiving, by a computer device, a request from a user for one or more objects;
determining that a type of one of the one or more requested objects is associated with one or more objects representative of instance level security, the one or more objects being in an object model;
in response to determining that the type is associated in the object model with the one or more objects representative of instance level security, determining access is authorized to at least some of the one or more objects, determining access comprising:
obtaining a first access statement associated with the type of the one or more objects;
obtaining, from the object model, one or more second access statements each associated with one of the one or more objects representative of instance level security;
prior to accessing a source of the one or more objects, combining at least the first access statement and the one or more second access statements into a third access statement, the third access statement referencing each of the type of the one or more objects and the one or more objects representative of the instance level security;
obtaining, based on the third access statement, the one or more objects;
determining, from an identifier of each of the one or more objects, whether access to that object is authorized;
based on determining whether access to that object is authorized, obtaining an authorized subset of the one or more objects using the third access statement, the authorized subset being limited to the one or more objects where access to that object is authorized; and
causing providing the at least some of the authorized subset of objects to the user.

16. The system of claim 15, further comprising:
determining that a type of one of the one or more requested objects is associated with a second object representative of instance level security; and
obtaining a fourth access statement associated with the second object representative of instance level security;
wherein combining at least the first access statement and the second access statement into a third access statement comprises combining the first access statement, the second access statement, and the fourth access statement.

17. The system of claim 16, wherein the obtaining an authorized subset of the one or more objects comprises obtaining one or more objects that are identified by both the second access statement and the fourth access statement.

18. The system of claim 16, wherein the obtaining an authorized subset of the one or more objects comprises obtaining one or more objects that are identified by either the second access statement or the fourth access statement.

19. The system of claim 15, wherein multiple objects representative of instance level security are associated with the same type of object.

20. The system of claim 15, wherein the object representative of instance level security is associated with a name and wherein determining the user is authorized to access at least some of the one or more objects is based at least in part on the name.

21. The system of claim 15, wherein securing the object using the object representative of instance level security does not require change to a user interface accessing the one or more objects.

* * * * *